United States Patent [19]
Alon et al.

[11] Patent Number: 5,907,526
[45] Date of Patent: *May 25, 1999

[54] METHODS AND APPARATUS FOR SIMULTANEOUSLY READING MULTIPLE TRACKS OF AN OPTICAL STORAGE MEDIUM

[75] Inventors: Amir Alon, Sunnyvale, Calif.; Jacob Finkelstein, Kfar Saba, Israel

[73] Assignee: Zen Research N.V., Curacao, Netherlands Antilles

[ * ] Notice: This patent is subject to a terminal disclaimer.

[21] Appl. No.: 08/804,105

[22] Filed: Feb. 20, 1997

Related U.S. Application Data

[63] Continuation-in-part of application No. 08/559,429, Nov. 15, 1995, Pat. No. 5,627,805.
[51] Int. Cl.[6] ............................ G11B 17/22; G11B 5/76
[52] U.S. Cl. ................................. 369/32; 369/60
[58] Field of Search ................................. 369/32, 33, 47, 369/48, 49, 50, 54, 58, 60, 124, 44.28, 97

[56] References Cited

U.S. PATENT DOCUMENTS

| | | |
|---|---|---|
| 4,074,085 | 2/1978 | Russell . |
| 4,283,777 | 8/1981 | Curry et al. ............................ 369/32 |
| 4,449,212 | 5/1984 | Reno . |
| 4,459,690 | 7/1984 | Corsover et al. . |
| 4,460,988 | 7/1984 | Gordon . |
| 4,486,870 | 12/1984 | Pettigrew et al. . |
| 4,536,866 | 8/1985 | Jerome et al. . |
| 4,566,092 | 1/1986 | Gérard et al. ............................ 369/59 |
| 4,646,280 | 2/1987 | Toyosawa . |
| 4,689,781 | 8/1987 | Ando ..................................... 369/112 |
| 4,720,825 | 1/1988 | Kokado . |
| 4,754,446 | 6/1988 | Reno ..................................... 369/112 |
| 4,766,582 | 8/1988 | Ando . |
| 4,815,067 | 3/1989 | Webster et al. ........................... 369/97 |
| 4,839,876 | 6/1989 | Fennema . |
| 4,890,272 | 12/1989 | Ando . |
| 4,918,676 | 4/1990 | Miyasaka . |
| 4,972,396 | 11/1990 | Rafner . |
| 4,980,876 | 12/1990 | Abate et al. . |
| 4,982,395 | 1/1991 | MacAnally ........................... 369/44.37 |
| 4,989,190 | 1/1991 | Kuroe et al. . |
| 5,001,732 | 3/1991 | Nomura et al. . |
| 5,081,617 | 1/1992 | Gelbart . |
| 5,105,407 | 4/1992 | Ishika ................................... 369/44.37 |
| 5,105,410 | 4/1992 | Maeda et al. ........................ 369/44.37 |
| 5,111,445 | 5/1992 | Psaltis et al. . |
| 5,128,919 | 7/1992 | Narahara et al. . |
| 5,140,577 | 8/1992 | Ohsato ................................. 369/44.37 |
| 5,150,347 | 9/1992 | Yanagi . |
| 5,199,017 | 3/1993 | Kagami et al. . |
| 5,210,726 | 5/1993 | Jackson et al. . |
| 5,233,583 | 8/1993 | Reno . |
| 5,239,529 | 8/1993 | Tobita et al. ............................. 369/48 |
| 5,239,530 | 8/1993 | Seo et al. . |
| 5,245,597 | 9/1993 | Lee et al. . |

(List continued on next page.)

FOREIGN PATENT DOCUMENTS

| | | |
|---|---|---|
| 089 264 A1 | 9/1983 | European Pat. Off. . |
| 0 506 447 | 9/1992 | European Pat. Off. . |
| 0 569 718 | 11/1993 | European Pat. Off. . |
| 598 611 A2 | 5/1994 | European Pat. Off. . |
| 643 388 A1 | 3/1995 | European Pat. Off. . |
| 0 714 096 | 5/1996 | European Pat. Off. . |
| 61-08563 | 5/1986 | Japan . |
| 2 188 474 | 9/1987 | United Kingdom . |

*Primary Examiner*—Paul W. Huber
*Attorney, Agent, or Firm*—Fish & Neave; Nicola A. Pisano; Michael J. DeHaemer, Jr.

[57] ABSTRACT

Methods and apparatus are provided for synchronously reading data from multiple tracks of an optical disk using multiple illumination beams. Circuitry is provided for use with a photodetector array to read and buffer data in parallel from the multiple adjacent tracks, while asynchronously providing processed data to a host processor. Circuitry is further provided for correcting phase errors resulting from variations in the linear velocity of the tracks being read, depending upon the radial position of the tracks.

12 Claims, 9 Drawing Sheets

U.S. PATENT DOCUMENTS

| | | |
|---|---|---|
| 5,274,507 | 12/1993 | Lee . |
| 5,283,776 | 2/1994 | Takagi . |
| 5,295,125 | 3/1994 | Oonishi et al. . |
| 5,301,174 | 4/1994 | Matoba et al. . |
| 5,313,448 | 5/1994 | Sukeda et al. . |
| 5,331,618 | 7/1994 | Nagai ........................................ 369/59 |
| 5,347,506 | 9/1994 | Matsudo et al. ......................... 369/124 |
| 5,361,245 | 11/1994 | Yoshida et al. . |
| 5,394,386 | 2/1995 | Park et al. . |
| 5,398,228 | 3/1995 | Maeda ..................................... 369/124 |
| 5,402,399 | 3/1995 | Oshiba et al. ................... 369/44.28 X |
| 5,426,623 | 6/1995 | Alon et al. . |
| 5,465,244 | 11/1995 | Kobayashi et al. . |
| 5,483,511 | 1/1996 | Jewell et al. .......................... 369/44.37 |
| 5,485,438 | 1/1996 | Koyama ................................ 369/44.28 |
| 5,508,990 | 4/1996 | Nagasaki et al. .......................... 369/60 |
| 5,555,539 | 9/1996 | Kamisada et al. ....................... 369/219 |
| 5,561,654 | 10/1996 | Hamilton et al. ..................... 369/60 X |
| 5,566,159 | 10/1996 | Shapira . |
| 5,600,626 | 2/1997 | Yokogawa et al. ................... 369/275.3 |
| 5,627,805 | 5/1997 | Finkelstein et al. ....................... 369/32 |

METHODS AND APPARATUS FOR SIMULTANEOUSLY READING MULTIPLE TRACKS OF AN OPTICAL STORAGE MEDIUM

RELATED APPLICATION

This application is a continuation-in-part of commonly assigned application Ser. No. 08/559,429, filed Nov. 15, 1995, now U.S. Pat. No. 5,627,805, issued May 6, 1997.

FIELD OF THE INVENTION

This invention relates to methods and apparatus for retrieving information from an optical disk at high data rates by simultaneously and synchronously reading multiple adjacent tracks.

BACKGROUND OF THE INVENTION

Due to their high storage density, long data retention life, and relatively low cost, optical disks are becoming increasingly popular as a means to distribute information. Large format disks have been developed for storing full length motion pictures. The compact disk (CD), and more recent mini disk (MD) formats were developed and marketed for the distribution of musical recordings and have essentially replaced vinyl records. High-capacity, read-only data storage media, such as CD-ROM, have become prevalent in the personal computer field, while the new Digital Video Disk (DVD) format may soon replace videotape as the distribution medium for video information.

An optical disk is made of a transparent disk or substrate in which data, in the form of a serial bit-stream, is encoded as a series of pits in a reflective surface within the disk. The pits are arranged along a spiral or circular track. Data is read from the optical disk by focusing a low power laser beam onto a track on the disk and detecting the light reflected from the surface of the disk. By rotating the optical disk, the light reflected from the surface of the disk is modulated by the pattern of the pits rotating into and out of the laser's field of illumination. Optical and imaging systems detect the modulated, reflected, laser light and produce an electrical signal which may be decoded to recover the digital data stored on the optical disk. The recovered digital data, which may include error correcting codes and additional subcoded information, is further processed to recover the stored data which may then be converted to audio signals, or used as executable programs and data depending on the type of optical disk being read.

To be able to retrieve data from anywhere on a optical disk, the optical systems include a pickup assembly which may be positioned to read data from any disk track. Servo mechanisms are provided for focusing the optical system and for keeping the pickup assembly positioned over the track, despite disk warpage or eccentricity.

Because in most previously known systems the data is retrieved from the disk serially, i.e. one bit at a time, the maximum data transfer rate for an optical disk reader is determined by the rate at which the pits pass by the pickup assembly. The linear density of the bits and the track pitch is fixed by the specification of the particular optical disk format. For example, CD disks employ a track pitch of 1.6 $\mu$m, while the DVD employs a track pitch only about one-half as wide.

Previously known methods of increasing the data transfer rate of optical disk readers have focused on increasing the rate at which the pits pass by the pickup assembly by increasing the rotational speed of the disk itself. Currently, drives with rotational speeds of 2× to 10× standard speed are commercially available, and 12× designs are on the horizon. However higher disk rotational speeds place increasing demands on the optical and mechanical subsystems within the optical disk player, making such players more difficult and expensive to design and manufacture.

Other previously known techniques for increasing average data transfer rates involve methods to intelligently anticipate future read requests by a host processor. It has been observed that data access by computers frequently exhibit "locality of reference," which means that a future data access will be local, in either space or time, to a previous data access. Thus a CD-ROM drive or controller can "read ahead" and buffer the data that the host processor is likely to request next. When the host processor next requests data from the optical disk drive, the drive first checks if the requested data has already been read and buffered. If the data has already been buffered, the drive simply sends the buffered data to the host, avoiding the delays associated with repositioning the pickup assembly and reading data from the optical disk itself. While such caching techniques may speed up average data transfer rates, the maximum data transfer rate is still limited by the rotational velocity of the optical disk within the optical disk reader.

U.S. patent application Ser. No. 08/559,429, filed Nov. 15, 1995, now, U.S. Pat. No. 5,627,805, incorporated herein by reference, describes a system to increase disk reading speeds by reading multiple tracks simultaneously. The data is read using a matrix detector that provides track signal data from each of a plurality of adjacent tracks. The system described therein employs a source of wide-area illumination to illuminate multiple tracks, which are then imaged onto the single matrix detector.

The present application is directed to an improvement in the system described in the above-incorporated patent, wherein the matrix detector and source of wide-area illumination are replaced by a multi-beam, multi-detector pickup assembly. Apparatus in accordance with the present invention obviates the Virtual Tracking System described in the foregoing application, instead employing conventional servo methods for tracking.

It would therefore be desirable to provide optical disk reading apparatus and methods that provide high speed retrieval of information from an optical disk while avoiding the limitations imposed on optical disk rotation speeds encountered by previously known devices.

It would also be desirable to provide an optical disk reading apparatus and methods that provide high speed retrieval of information from an optical disk using a multi-beam, multi-detector pickup assembly.

SUMMARY OF THE INVENTION

In view of the foregoing, it is an object of the present invention to provide an optical disk reading apparatus and methods that provide high speed retrieval of information from an optical disk while avoiding the limitations imposed on optical disk rotation speeds encountered by previously known devices.

It is a further object of this invention to provide an optical disk reading apparatus and methods that provide high speed retrieval of information from an optical disk using a multi-beam, multi-detector pickup assembly.

These and other objectives of the invention are accomplished by providing methods and apparatus for processing, tracking, and reading data from multiple adjacent tracks simultaneously. In particular, apparatus constructed in accordance with the present invention employs a pickup assembly including a diffraction grating that splits a source of laser light into a plurality of beams for illuminating multiple tracks of an optical disk. A plurality of photodetectors simultaneously generate electrical data signals representative of the information-bearing pits on respective ones of the multiple adjacent data tracks of the optical disk. Methods and apparatus are provided for synchronizing the readout of the data from the multiple adjacent tracks to account for radial variations in linear velocity, and its effect on signal phase and frequency. Electrical data signals are then processed in accordance with previously known demodulation, decoding and error correction schemes and the resulting bit stream is buffered. The buffered data is subsequently asynchronously read out of the buffer for further processing per se known in the fields of digital audio, video, and computer processing.

Further features of the invention, its nature and various advantages will be more apparent from the accompanying drawings and the following detailed description of the preferred embodiments.

DETAILED DESCRIPTION OF THE INVENTION

Figure 1:
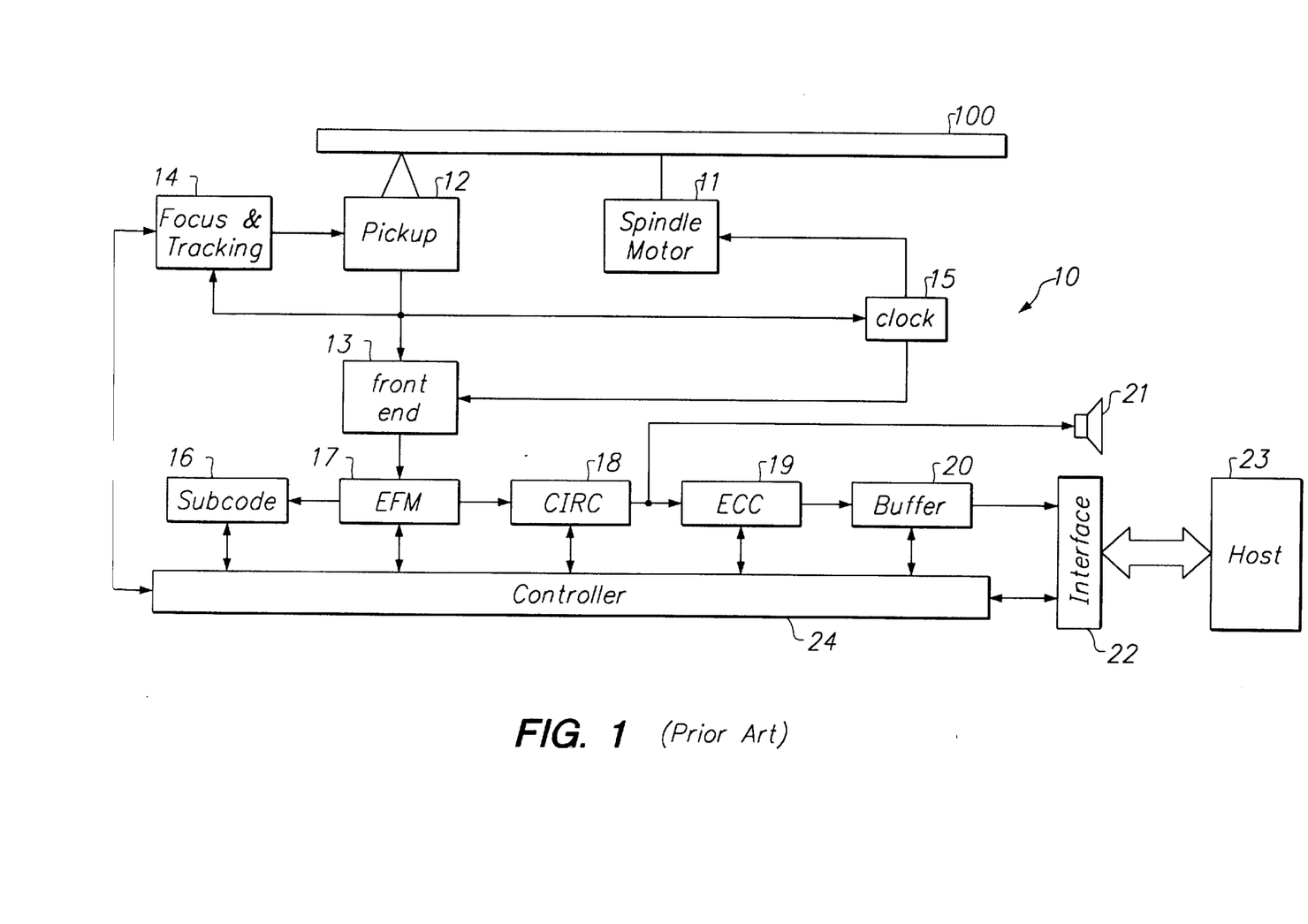
FIG. 1 is an illustrative block diagram of a previously known optical disk reader.

By way of overview, a brief description of the components and operation of a previously known optical disk reader 10 is provided with respect to FIG. 1. The detailed description of the design and operation of such previously known optical disk readers may be found, for example, in *Compact Disk Technology*, H. Nakajima and H. Ogawa, published by Ohmsha, Ltd., Japan (1992), translated by Aschmann, C., IOS Press, Inc., Burke, Va., and *The Compact Disk Handbook*, Ken C. Pohlmann (2nd Ed. 1992), A-R Editions, Inc., Madison, Wis., both of which are incorporated herein in their entirety by this reference. The present invention is then described where it differs in major respects from the previously known system of FIG. 1.

It will of course be understood that the prior art system of FIG. 1 is merely illustrative of the various types of optical disk apparatus in which the methods and apparatus of the present invention may be employed. Thus, for example, applicants expect that the invention described herein may be advantageously employed in any optical disk system, including DVD systems.

Overview of a Prior Art Optical Disk System

Illustrative previously known optical disk reader 10 comprises a spindle motor 11 that rotates optical disk 100 at high speed and pickup assembly 12 including an illumination source and a photodetector for generating electrical signals representative of information-bearing pits formed in a reflective surface within optical disk 100. The electrical signals from the photodetector of pickup assembly 12 are then passed to front end circuitry 13 for extracting a digital data signal. Under the control of controller 24, the data signal is further processed by eight-to-fourteen (EFM) demodulation circuitry 17, Cross Interleaved Reed-Solomon Code (CIRC) decoder 18, error correction code (ECC) circuitry 19, and subcode circuitry 16. Controller 24 also controls focus and tracking circuitry 14, as well as buffer 20 and interface 22.

For a digital audio system, the data signals may be processed into suitable analog signals (using circuitry not shown) connected to audio means 21. Similarly, if the optical disk contains video images, the data signals may be processed for direct display on a TV or monitor. In computer applications the data signals are typically transferred from buffer 20 to host processor 23 via interface 22.

Spindle motor 11 spins optical disk 100 at a speed that depends upon the radial location of pickup assembly 12 (for example, for a 1× CD-ROM spindle speed, approximately 200–500 RPM), to maintain a constant linear velocity of an optical disk track relative to pickup assembly 12. For a CD-ROM format, this linear velocity is generally 1.4 m/s, while for the DVD format it approaches 4 m/s. Pickup assembly 12 typically includes a laser diode that illuminates only a single data track on optical disk 100 and an optical sensor onto which an image reflected from the optical disk is projected. The intensity, or other property, of the light beam reflected from the surface of optical disk 100 is modulated by inhomogeneities in the reflective surface of the optical disk (i.e., bumps or pits, referred to hereinafter as "data spots") arranged in spiral or circular tracks on optical disk 100.

Pickup assembly 12 includes circuitry to generate an electronic signal representative of the modulation in the illumination impinging upon its optical sensor due to the presence of the data spots. To ensure that the laser illumination remains focused on the reflective surface of optical disk 100, pickup assembly 12 also provides signals to focus and tracking circuitry 14.

The data spots are recorded on optical disk 100 using a modulation code that permits a data clock to be recovered from the data as it is read off of the optical disk. Clock circuitry 15 includes phase-locked-loop (PLL) circuitry for recovering the data clock from, and maintaining the data clock in synchrony with, the modulated electronic signal from pickup assembly 12. In addition to being used for extracting the data from the modulated signal, the data clock is representative of the linear velocity of the data track relative to pickup assembly 12 and may be used as a feedback signal to control the speed of spindle motor 11 to maintain a constant linear velocity.

Front end circuitry 13 uses the data clock from clock circuitry 15 to recover a serial stream of bits from the electronic signal. Front end circuitry 13 contains additional circuitry to identify synchronization codes in the bit stream so that the serial bit stream may be correctly assembled into multi-bit data words which are transferred to demodulation circuitry 17. Demodulation circuitry 17 may be programmed for eight-to-fourteen demodulation, eight-to-fifteen demodulation (as in the SD systems), eight-to sixteen demodulation (EFM Plus), or may use another suitable demodulation scheme. The demodulated data words, or symbols, are then assembled into blocks and decoded by CIRC decoder 18 using a form of Cross Interleaved Read-Solomon code, for example, CIRC for CD-formats and CIRC Plus for DVD. Demodulated data words are also provided to subcode circuitry 16 which extracts data, such as block numbers, or song titles, that may be recorded in the subcode channels embedded in each block of data words.

For video and audio optical disk players, the data from CIRC decoder 18 represents, in digital form, the video or audio signal that was originally recorded and stored on the disk. These signals may then be converted to analog signals and the original recorded signal reproduced using conventional audio or video devices 21. Errors in the recovered audio or video signals are handled by interpolation and filtering circuitry (not shown) to calculate a value to use in place of the erroneous data. Because of the interpolation process, isolated errors in an audio or video signal are unlikely to be noticed when listening to the audio or viewing the video signals.

However, since a single bit error in data representing a computer program may render the program inoperable or the data unusable, optical disks used for the storage and distribution of data and programs must have very low data error rates. To reduce the data error rates to acceptably low levels, error correction codes (ECC) are added to the data when it is recorded to the disk. ECC circuitry 19 uses error correcting codes to detect and possibly correct errors in the data. Finally, the data is buffered in memory buffer 20 for transfer to host processor 23 via interface 22. Controller 24 coordinates operation of each of the optical disk reader subsystems and to control the operation of the optical disk reader as a whole.

In the previously known optical disk reader of FIG. 1, the rate of data transfer between the optical disk itself and the host processor is limited by the rate at which the data can be processed by the circuitries shown in FIG. 1. For example, for a 1× CD-ROM reader, the data rate of the signal being read from the optical disk is about 4.32 MHZ, well within the processing capabilities of the electronic circuits involved. Even in optical disk readers having a spindle speed 8× the standard speed, the data transfer rate is limited by the speed at which the data can be read off the disk.

Overview of the Present Invention

Figure 2:
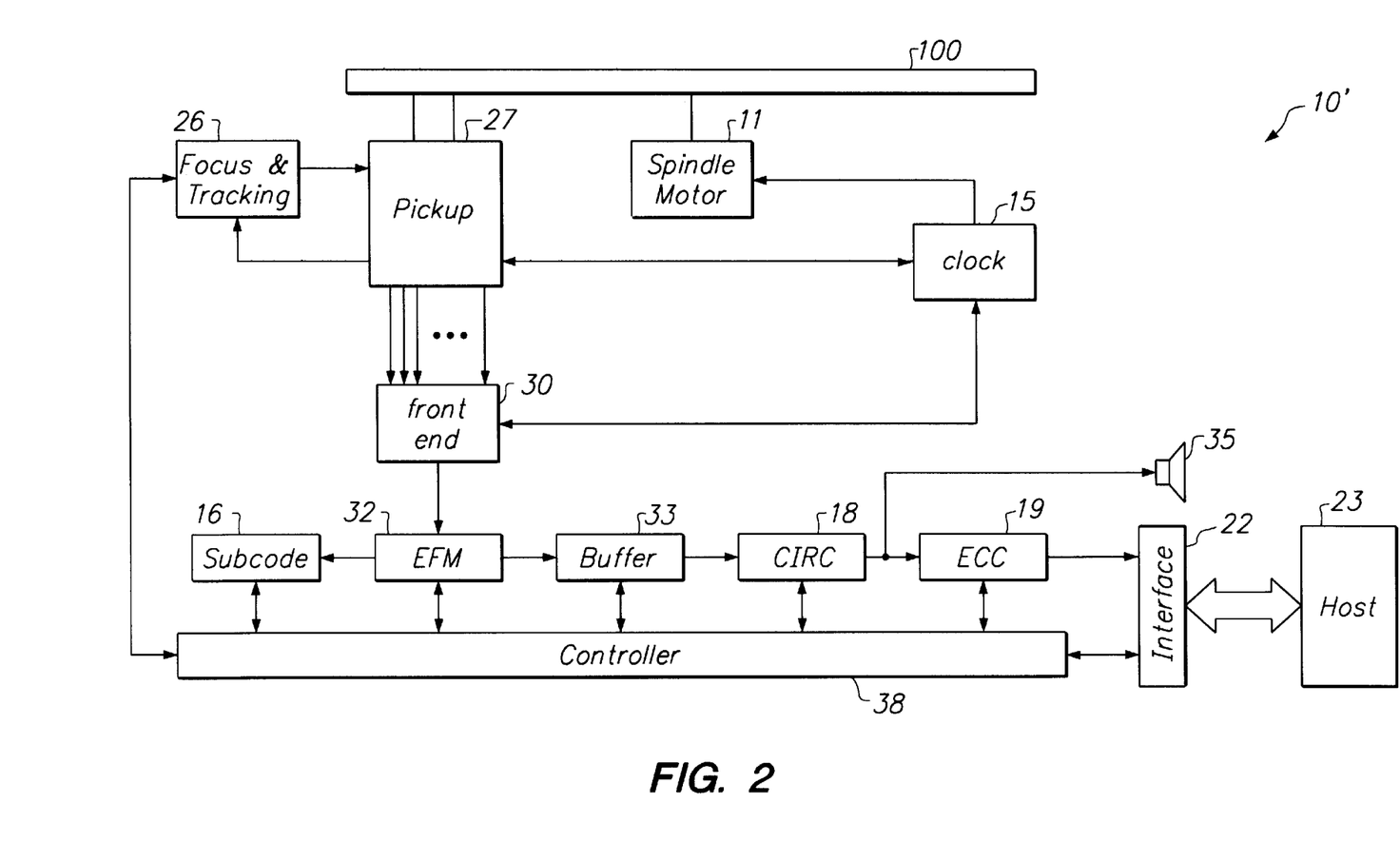
FIG. 2 is an illustrative block diagram of an optical disk reader constructed in accordance with the principles of the present invention.

Referring now to FIG. 2, optical disk reader 10' is described that provides a high data transfer rate, in accordance with the principles of the present invention, by reading multiple tracks of data from an optical disk simultaneously. Much of the circuitry of FIG. 2 may be common to or readily adapted from the circuitry of the system of FIG. 1. Accordingly, the following description describes in detail the differences between a previously known optical disk reader and apparatus 10' constructed in accordance with the principles of the present invention.

In particular, apparatus 10' includes a multi-beam, multi-detector pickup assembly for illuminating and reading multiple adjacent data tracks; phase-lock loop circuitry that permits a clock associated with a reference track to be used for synchronizing the recovery of data from neighboring tracks; and a parallel write/asynchronous read architecture that enables blocks of data to be read from the optical disk, processed and written to a buffer in parallel while being asynchronously retrieved from the buffer by a host computer.

Apparatus 10' of FIG. 2 includes pickup assembly 27 including a source of laser illumination, a diffraction grating for splitting the laser illumination into three or more illumination beams and a corresponding number of photodetectors onto which multiple illumination beams, reflected from the optical disk, are focused by an optical system. Pickup assembly 27 is described in greater detail hereinbelow. Each of the multiple photodetectors in pickup assembly 27 generates an electrical signal representing data read from a corresponding data track on optical disk 100, and provides that electrical signal to front end circuitry 30.

Front end circuitry 30 performs a function similar to that of front end circuitry 13 of FIG. 1, except that multiple bit streams are processed concurrently, so additional circuitry is provided for buffering and synchronizing data transfers to subsequent processing circuitry. Front end circuitry 30 also includes a multiplexer for routing multiple data streams to demodulation circuitry 32.

Buffer 33 is provided to buffer the data read from the multiple data tracks, and to decouple the process of reading data from optical disk 100 from the process of transferring the data to host processor 23. Buffer 33 therefore is large enough to hold about as many data blocks from multiple data tracks of optical disk 100 as can be read in one revolution of optical disk 100. Controller 38 maps data from the multiple data tracks to buffer 33 so that individual data blocks will be correctly assembled without overwriting one another. As will be appreciated by those of skill in the art of buffer design, this mapping may be either dynamic or static.

Figure 3:
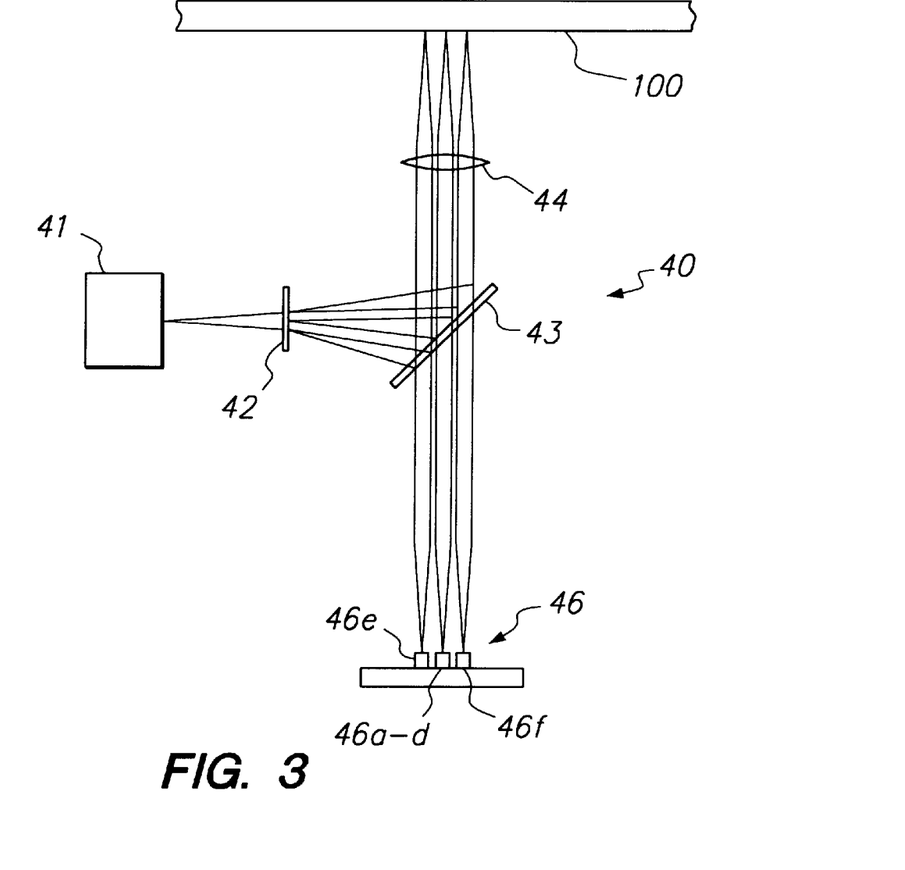
FIG. 3 is a block diagram of an illustrative embodiment of a multi-beam, multi-detector pickup assembly suitable for use in the present invention.

With respect to FIG. 3, pickup assembly 40 suitable for use in an optical disk reader constructed in accordance with the principles of the present invention is described. Pickup assembly 40 includes a source of laser illumination 41, i.e., a laser diode, diffraction grating 42, beam splitter 43, objective lens 44, and photodetector array 46. Diffraction grating 42 splits the laser light emitted by laser diode 41 into three (or more) illumination beams, which are bent by beam splitter 43 and focused by objective lens 44 onto three (or more) adjacent tracks of information-bearing pits on optical disk 100. As will of course be understood, the illumination beams are spaced apart by the track pitch, for example, for the CD-ROM format, 1.6 $\mu$m apart. The illumination beams, once reflected from the information bearing surface within optical disk 100, pass through beam splitter 43 and are focused on corresponding photodetectors in photodetector array 46. Alternatively, multiple beams may be formed from the light emitted by the laser diode using the beam splitter apparatus described, for example, in Corsover et al. U.S. Pat. No. 4,459,690.

Figure 4:
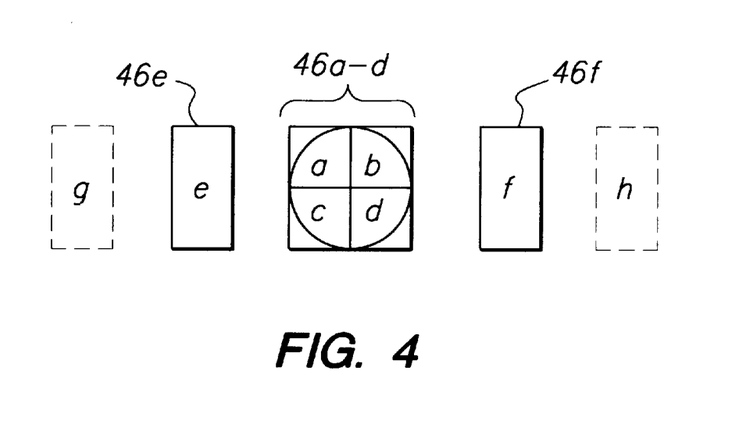
FIG. 4 is a detailed view of the arrangement of the detector elements in the pickup assembly of FIG. 3.

As shown in FIG. 4, photodetector array 46 includes a central four quadrant detector comprising elements 46a–46d, and outboard detectors 46e and 46f for reading adjacent data tracks. Photodetector array 46 illustratively includes three detectors for reading three adjacent tracks of optical disk 100, although additional detectors may be disposed on either or both sides of the four quadrant detector (indicated by dotted line detector elements g and h).

Detectors 46a to 46d are summed to provide an electrical signal representative of the information contained in the data track imaged onto the four quadrant detector by the optical system, while detectors 46e and 46f provide electrical signals representative of the information contained in the adjacent data track on either side of the track imaged onto the four quadrant detector. As is conventional, the difference between the sums of the diagonal quadrants, i.e., $e_{focus}=(46a+46d)-(46b+46c)$, may be computed to generate a focus signal using the well known astigmatism method, while a tracking signal may be generated as the difference of the sums of the quadrants on the same side of the track, i.e., $e_{track}=(46a+46c)-(46b+46d)$. The focus error signal $e_{focus}$ and tracking error signal $e_{track}$ are input to focus and tracking circuitry 26.

Multi-track Phase Lock Loop Circuitry

Figure 5:
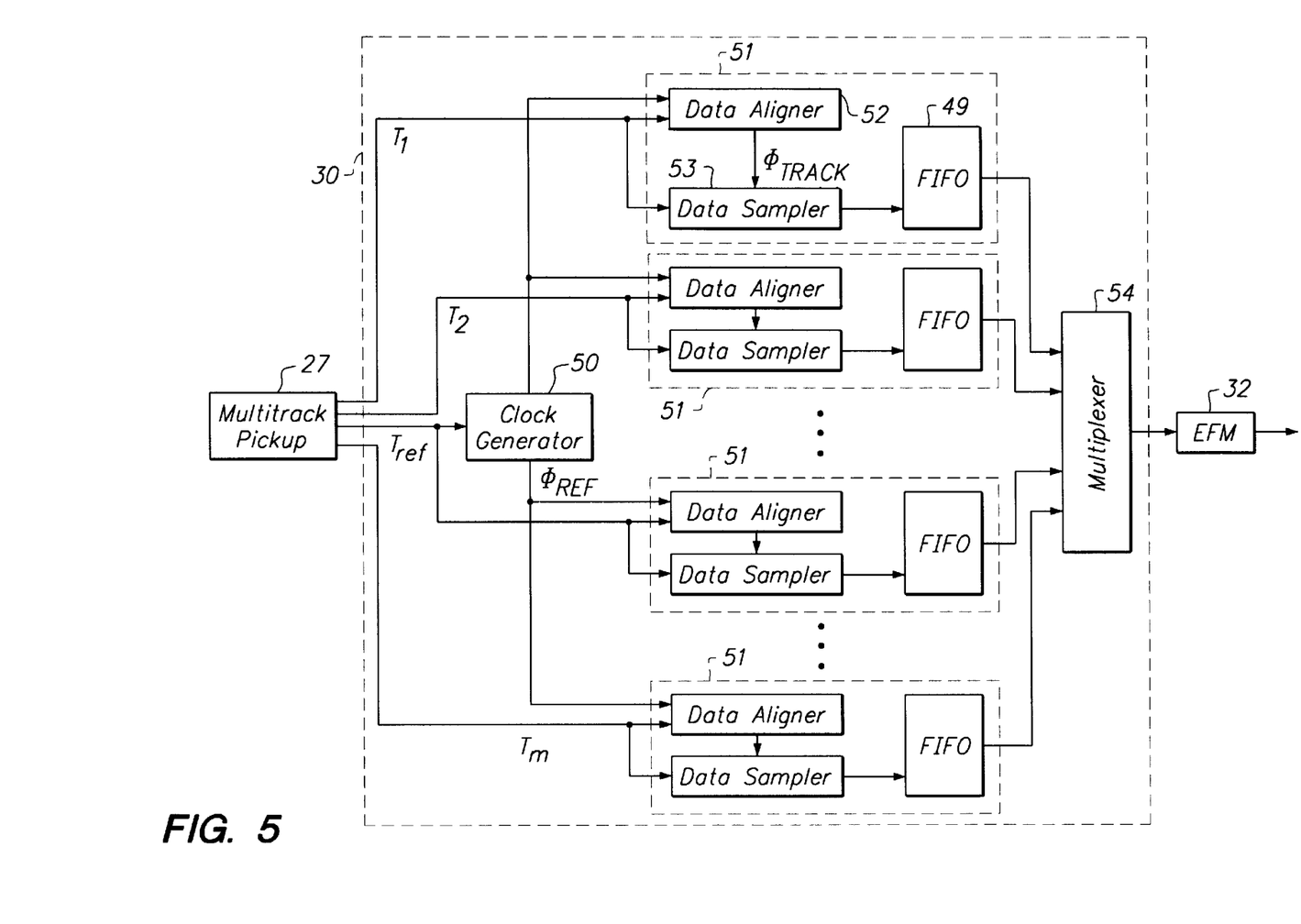
FIG. 5 is a block diagram of the front end circuitry for extracting data from the signals output by the pickup assembly of FIG. 3.

Referring now to FIG. 5, pickup assembly 27 outputs track data signal, $T_1 \ldots T_m$, corresponding to m tracks being read (illustratively, three for the pickup assembly of FIGS. 3 and 4). The track data signals, $T_1 \ldots T_m$, output by photodetector array 46 are then processed by front end circuitry 30, including clock generation circuitry 50 and track processing circuitry 51, to extract data from each track signal. Multiplexer 54 selects extracted data words from each of track processing circuitries 51 for decoding by demodulation circuitry 32.

An accurate data clock is needed to reliably extract the data from the track data signals. By design, a track data signal is self-clocking, that is, the data stored in a data track is formatted so that a data clock can be recovered from the track signal. Typically, a Phase-Locked Loop (PLL) is used to recover the clock signal from the track data signal. In optical disk reader 10' of the present invention, clock generation circuitry 50 recovers a reference clock signal from a selected one of the multiple data tracks being read. The reference track may be, for example, the middle, innermost or outermost track of the multiple tracks being read.

The reference clock, $\Phi_{REF}$, generated by clock generation circuitry 50 has a frequency and phase which are correct for the reference track data signal. However, because the track data signals are read from tracks having different radii, and therefore slightly different linear velocities, the corresponding track data signals differ slightly in frequency and may differ substantially in phase. For example, for a CD-ROM optical disk, applicants have determined that the change in linear velocity, and therefore the difference in track data signal frequency, between any two adjacent tracks is approximately 0.01% anywhere on the optical disk. Furthermore, since the track data signal frequencies differ, the phase difference between any pair of tracks varies continuously. Consequently, a single data clock cannot be used directly to extract data from each track data signal. Track processing circuitries 51 therefore include data aligner circuitry 52 for synchronizing reference data clock $\Phi_{REF}$ to the individual track data signals, and data sampler 53 for sampling the track data signal.

Track processing circuitry 51 also includes first-in/first-out buffer (FIFO) 49 for assembling the serial data into parallel data words and for synchronizing transfer of the assembled data words from track processing circuitry 51 to demodulation circuitry 32 via multiplexer 54. Advantageously, assembling the data words in track processing circuitry 51 reduces the frequency at which subsequent circuitry operates. For example, in a standard speed CD-ROM drive, each track has a data rate of approximately four million bits per second (Mbps). Thus, multiplexer 54 would have to operate at a frequency of approximately 40 MHz (4 Mbps×10 tracks). However, by converting the data into words reduces operating frequency to about 2.9 MHz (40 Mbps/14 bits per word), greatly simplifying circuit design.

Figure 6A:
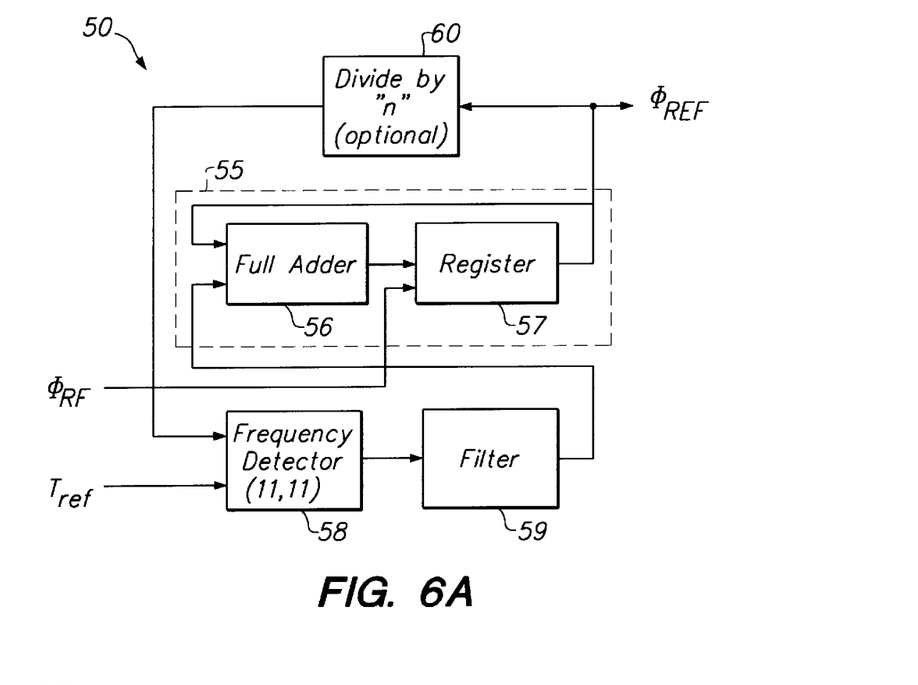
FIGS. 6A and 6B are more detailed block diagrams of the clock generation circuitry and exemplary frequency detector circuitry, respectively, of FIG. 5.
Figure 6B:
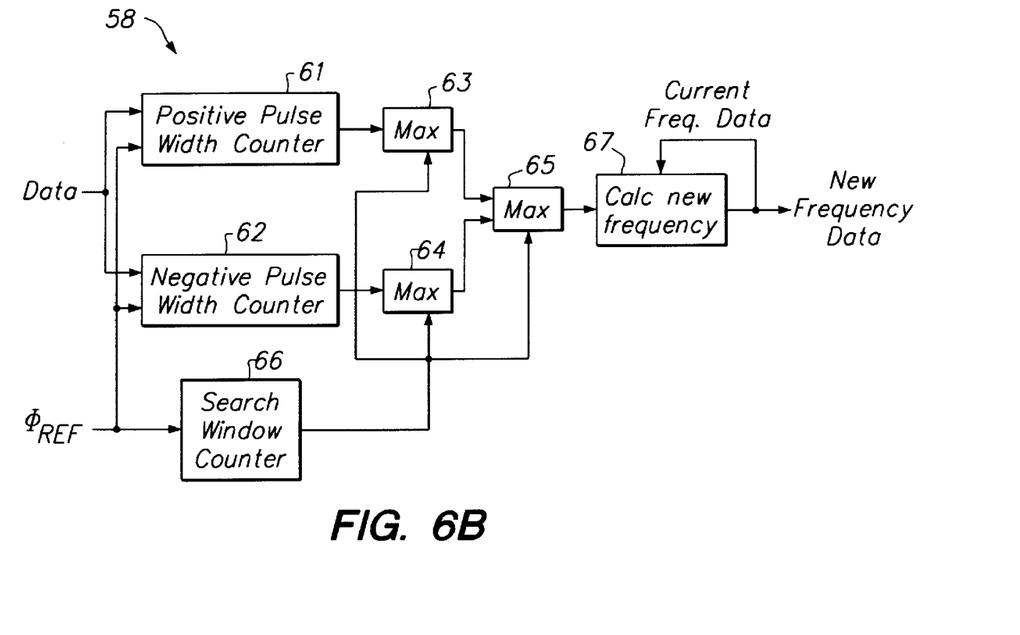

Referring now to FIGS. 6A and 6B, clock generation circuitry 50, is described in greater detail. The core of clock generation circuitry 50 is formed by accumulator 55, comprising full adder 56 and register 57. The output of register 57 is fed back to one of the inputs of full adder 56; the other input being a frequency increment value supplied by filter 59. Register 57 latches the output of full adder 56 on every cycle of on its clock input. Since the output of full adder 56 is the sum of the contents of register 57 and the frequency increment, the data value stored in register 57 is incremented by the frequency increment every clock cycle.

The clock input to register 57 is provided by a radio frequency (RF) clock signal $\Phi_{RF}$. Although many frequencies may be used, frequencies greater than about 200 MHZ are preferable, as higher frequencies provide greater precision and finer control over the frequency of reference clock, $\Phi_{REF}$. Thus, the data value in register 57 is incremented at a rate determined by the frequency increment provided by filter 59 and the frequency of $\Phi_{RF}$.

Eventually, the sum of the frequency increment and the value stored in register 57 will no longer fit in register 57, and the register will overflow. A new clock signal, $\Phi_{REF}$, may then be generated whenever register 57 overflows, which will occur at a frequency given by:

$$F_{REF} \approx F_{RF}\left(\frac{\text{Frequency Increment}}{\text{Register Capacity}}\right) \approx F_{RF}\left(\frac{\text{Frequency Increment}}{2^{Register\ size}}\right) \quad (1)$$

Alternatively, the most significant bit (MSB) of register 57 may provide the new clock signal. While the frequency of $\Phi_{RF}$ and the size of register 57 are fixed, the value of the frequency increment may be generated so that the frequency of $\Phi_{REF}$ is a multiple of the bit rate of reference track $T_{REF}$, e.g., eight times the bit rate.

Although the nominal bit rate of a CD-ROM is known, the CD-ROM specification permits a variation of ±10% in linear track velocity. Thus, the bit rate of the reference track may also vary. In accordance with the principles of the present invention, frequency detector 58 varies the frequency increment as needed to adjust $\Phi_{REF}$ to match the $T_{REF}$ bit rate.

Data on a CD-ROM is encoded using an eight-to-fourteen code, in which no fewer than three and no more than eleven consecutive bits have the same value. Since data is recorded so that the beginning and end of a data spot indicate transitions in the bit pattern (i.e., 0 to 1 or 1 to 0), a track data signal appears as a square wave in which the positive and negative half cycles are at least three, and at most eleven, bit periods long. Thus, in accordance with principles of the present invention, a proper data clock frequency can be determined by measuring the pulse width of the longest and/or shortest positive and negative half cycles in a track data signal. By extension, other unique pulse widths, such as the shortest possible pulse width, or the duration of a unique sequence of pulses, may be used.

Advantageously, data on a CD-ROM is organized into sectors and frames, wherein each frame is 588 bit periods in length and begins with a unique synchronization pattern comprising a sequence of eleven identical bits of one polarity followed by eleven bits of the opposite polarity (e.g., 00000000000011111111111 or its complement), otherwise referred to herein as an (11,11) pattern. Thus, once every 588 data clock periods a data track signal should contain a pulse width of eleven clock periods.

Referring now to FIG. 6B, frequency detector 58 includes two counters, positive pulse width counter 61 and negative pulse width counter 62. Positive pulse width counter 61 is reset during a negative half-cycle of the reference track data signal. During a positive half cycle, positive pulse width counter 61 measures the width of the half-cycle by counting cycles of clock $\Phi_{REF}$. Similarly, negative pulse width counter 62 measures the width of negative half-cycles of the reference track data signal. Divide by "n" block 60 may be provided to alter the resolution of the counters by altering the rate the counters are clocked.

Maximum tracking circuitries 63 and 64 keep track of the largest count reached by pulse width counters 61 and 62, respectively, during a search interval or window. Maximum selecting circuitry 65 then selects the larger of the outputs of maximum tracking circuitries 63 and 64 for use in calculating a new frequency increment by block 67.

Search window counter 66 is configured to periodically reset maximum tracking circuitries 63 and 64, and maximum selecting circuitry 65. Because each frame of data begins with an (11,11) pattern, frequency detector 58 should see an eleven-bit-wide pulse at least once a frame. Therefore, search window counter 66 should not reset the other circuits more often than once per data frame. For example, search window counter 66 may reset the maximum tracking and selecting circuitries 63–65 at most once every 512 data clock cycles, and preferably about every 600 data clock cycles.

As noted above, the maximum pulse width should be eleven bit periods wide. A pulse width more than eleven bit periods wide indicates that the reference clock frequency is too high, and should be reduced. Conversely, a shorter pulse width indicates a reference clock frequency that is too low. From equation (1), the reference clock frequency is directly proportional to the frequency increment, thus, the reference clock frequency may be raised by using a larger frequency increment. Although many functions may be used to calculate a new frequency increment, a suitable function for this purpose is given by:

$$(\text{Freq. Increment})_{new} = (\text{Freq. Increment})_{old} \times \frac{11 \text{ bit periods}}{\text{Max pulse width}} \qquad (2)$$

wherein max pulse width refers to the length of an 11-bit pattern as measured by counters 61 or 62; and 11 bit periods refers to the correct length.

At times, large changes in the reference clock frequency may be undesirable. For example, when trying to lock onto the frequency of the reference track data signal after repositioning pickup 27 (FIG. 2), large changes in reference frequency may be acceptable. However, after frequency lock occurs and data is being read from multiple data tracks on the disk, sudden large changes in the reference clock frequency may cause data errors. Accordingly, the frequency increment is preferably filtered to provide a controlled transition from the old value to the new value.

For example, the frequency increment may be filtered using Equation (3). In Equation (3), the new frequency increment is a weighted average of the old $$FI_{new} = (1-\alpha) FI_{calculated} + (\alpha) FI_{old} \qquad (3)$$

frequency increment and the frequency increment calculated from Equation (2), wherein the relative contributions of the old and calculated values is determined by the value of α. Thus, the size of any change in the reference clock frequency by appropriate selection of α. For example, small values of α enable large, rapid frequency changes so a new frequency may be acquired rapidly, whereas large values of α may be used to limit frequency changes after frequency lock is obtained. Preferably, α is a power of 2, so that Equation (3) may be calculated using simple shift and add operations.

Figure 7:
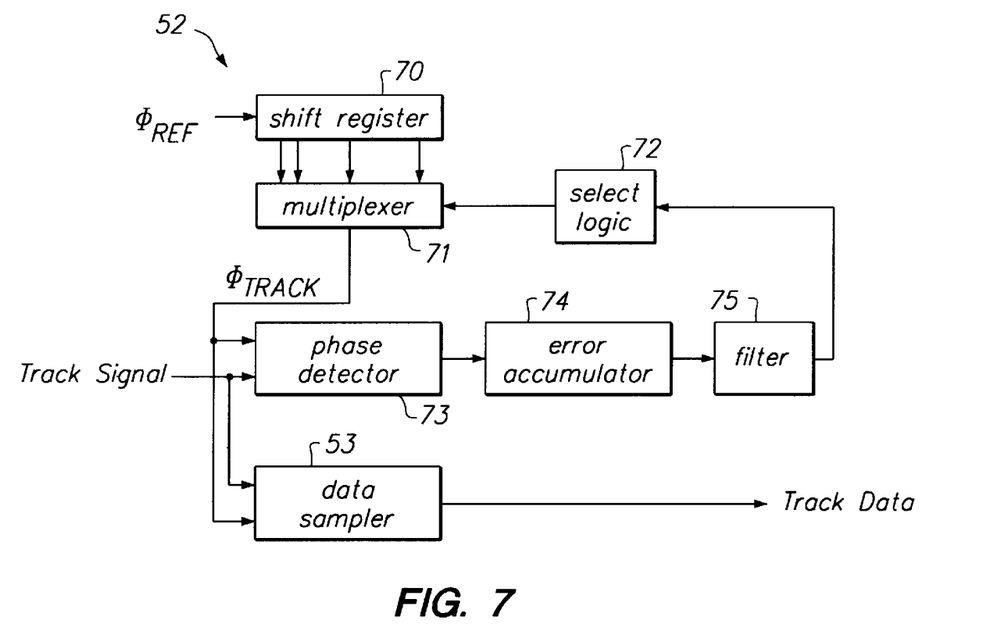
FIG. 7 is a block diagram of the data aligner and data sampler circuitry of FIG. 5.

Referring to FIG. 7, data aligner circuitry 52 of front end circuitry 30 uses reference clock signal $\Phi_{REF}$ to generate track data clocks, $\Phi_{TRACK}$, synchronized to each track being read. Front end circuitry 30 also includes data sampler 53 which uses a corresponding $\Phi_{TRACK}$ to sample the track data signals $T_1$–$T_m$ at the center of each bit period.

Reference clock signal $\Phi_{REF}$ is used as the clock input to shift register 70, which is configured as a ring counter. Shift register 70 is loaded with a bit pattern having only a single bit which is set, for example 01000000$_2$, the remaining bits being cleared. Each pulse of reference clock $\Phi_{REF}$ causes the bit pattern in shift register 70 to shift one bit position, or cell. A bit which is shifted out the end of shift register 70 is "wrapped around" and shifted back in at the other end of the shift register. Thus the single set bit in shift register 70 circulates through each cell in the register at a rate determined by reference clock $\Phi_{REF}$.

The value of each cell in shift register 70 is input to multiplexer 71, which functions to output the value of a selected one of the shift register cells. The combination of shift register 70 and multiplexer 71 functions to divide the frequency of reference clock $\Phi_{REF}$ by the number of bits in the shift register to produce track data clock $\Phi_{TRACK}$. For example, if shift register 70 were to have eight bits, each bit position would have a '1' bit in it only once every eight pulses of the reference clock. Thus if multiplexer 71 were to selectively output the value of bit three of shift register 70, the output of the multiplexer would be a '1' whenever there was a '1' in bit position three of the shift register, i.e. once every eight pulses of reference clock $\Phi_{REF}$.

Ideally, the phase of the track data clock $\Phi_{TRACK}$, should be such that the track data signal, $T_n$, is sampled at the center of each bit period. If the track data clock phase is not correct, the track data signal may be sampled too early or too late in each bit period, thereby risking sampling the data track signal during a transition from one bit to the next. Phase detector 73 measures the relative phase between track data clock $\Phi_{TRACK}$ and track data signal $T_n$ and provides an error signal indicative of the phase error to error accumulator 74.

Filter 75 smooths the accumulated phase error values to remove clock jitter and small variations in phase error. The output of filter 75 is used by select logic 72 to control multiplexer 71 to reduce any phase error. When the error is sufficiently large to warrant corrective action, select logic 72 adjusts the phase of track clock $\Phi_{TRACK}$ by causing multiplexer 71 to select a different input to pass through to its output. Changing the input of multiplexer 71 either inserts or removes a small amount of time to the interval from one track clock pulse to the next such pulse. For example, if shift register 70 has eight bits and is designed to shift bits to the right, and if select logic 72 causes multiplexer 71 to change its input one bit position to the left, the next pulse output by multiplexer 71 will occur on the seventh reference clock pulse instead of the eighth. Conversely, changing the input of multiplexer 71 one bit position to the right will cause a track clock pulse to occur on the ninth reference clock pulse.

Thus by changing the bit selected by multiplexer 71, the phase and frequency differences between the reference track data signal and another track data signal can be corrected.

Because a track clock pulse cannot be dropped or missed without corrupting the recovered data, select logic 72 includes logic to prevent selection of a different input by the multiplexer at an inopportune time. For example, if multiplexer 71 is reading bit position 6 of shift register 70, a '1' is in bit position five, and shift register 70 shifts right (i.e. the '1' in bit position six moves to bit position five) at the same instant select logic 72 switches the input of multiplexer 71 from bit position five to bit position six, a clock pulse will be missed, and a data bit will not be sampled correctly. Just as a change in input to multiplexer 71 in a direction opposite to the direction of the bit shifts in shift register 70 can cause a dropped clock pulse, a change in the same direction as the bit shifts can cause an extra clock pulse to occur. Since too few or too many clock pulses may garble the data being read, select logic 72 monitors the output of shift register 70 to avoid the occurrence of situations which may lead to data corruption.

Figure 8:
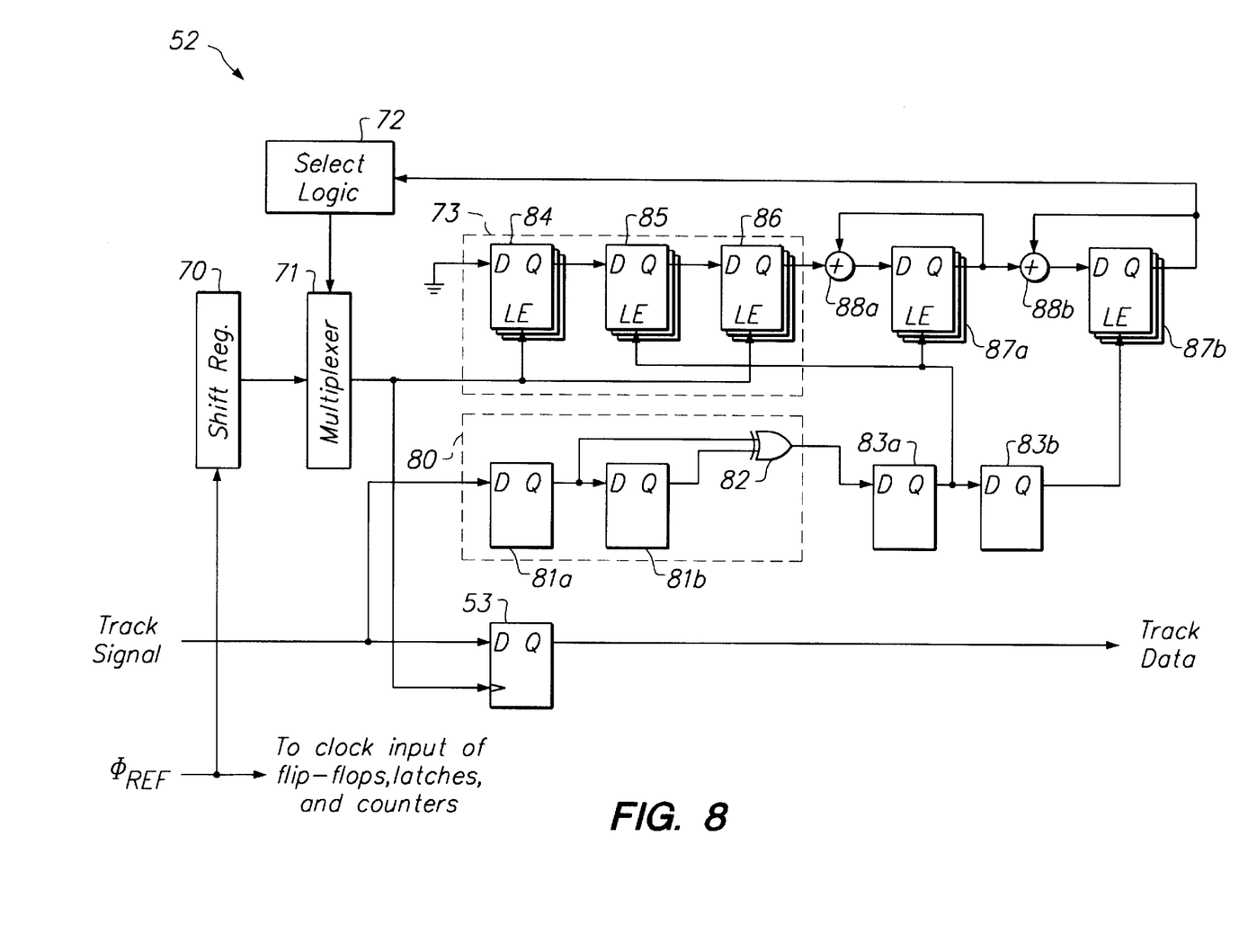
FIG. 8 is a more detailed block diagram of exemplary data synchronization circuitry of FIG. 7.

A more detailed illustrative embodiment of data aligner circuit 52 of FIG. 7 is described with respect to FIG. 8. Edge detector 80 comprises flip-flops 81a and 81b, and XOR gate 82. Flip-flops 81a and 81b are configured as a shift register having an input connected to the track data signal $T_n$ and clocked by reference clock, $\Phi_{REF}$. XOR gate 82 compares the values of the two flip-flops and provides an edge signal whenever the outputs of the flip-flops differ, thus indicating an edge in the track data signal. The edge signal is latched by flip-flop 83a. Flip-flop 83b holds the previous value of the edge signal.

Phase detector 73, including up-counter 84, down-counter 85, and latch 86, determines the phase relationship between the occurrence of pulses of the track data clock, $\Phi_{TRACK}$, output by multiplexer 71 and edges in the track data signal as determined by edge detector 80. Ideally, a signal from edge detector 80 should occur midway between successive pulse of track data clock $\Phi_{TRACK}$. An edge signal which occurs early indicates that track clock $\Phi_{TRACK}$ is slow, and conversely a late edge pulse indicates the track clock is fast.

Up-counter 84 is reset by the track data clock, and begins counting up at a rate determined by reference clock $\Phi_{REF}$. When an edge is detected by edge detector 80, the output of up-counter 84 is loaded into down-counter 85, which counts down at the same rate as up-counter 84. On a subsequent track clock pulse, the value of down-counter 85 is latched by latch 86. If the edge occurred midway between successive track data clocks, the time spent counting up equals the time spent counting down and the value in latch 86 should be zero. However, if the edge occurs early, more time is spent counting down and a negative value is latched. Conversely, a positive value indicated a late edge detection.

The output of phase detector 73 indicates the position of an edge pulse relative to the midpoint between successive track clock pulses, and, therefore, represents a phase error in the track data clock. The phase error is accumulated by latch 87a and adder 88a, and subsequently filtered by adder 88b and latch 87b to produce an average error level. Note that it may be necessary to sign-extend the output of phase detector 73, to avoid underflow and overflow conditions in adders 88a and 88b. As described hereinabove, the average, filtered, phase error signal is then used by select logic 72 to control multiplexer 71 and thereby adjust the track data clock phase and frequency as needed to minimize the average phase error.

Figure 9A:
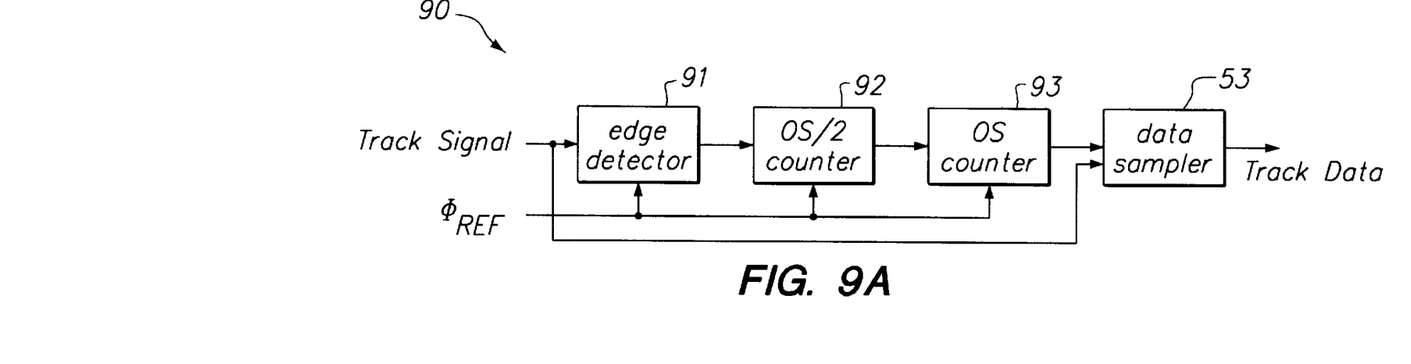
FIGS. 9A and 9B are, respectively, an alternative embodiment of the data aligner of FIG. 7 and a corresponding timing diagram.

In FIG. 9A, alternative data aligner 90 is shown. As discussed hereinabove, reference clock $\Phi_{REF}$ is derived from the reference track data signal. Since it has a frequency that is a multiple of the reference track data frequency, an interval corresponding to bit period in the track data signal may be measured by counting cycles of $\Phi_{REF}$. The ratio of $\Phi_{REF}$ to the reference track data rate is referred to herein as the over sampling factor.

Data aligner 90 includes edge detector 91, which may be the same as edge detector 80 of FIG. 7, as well as counters 92 and 93. When an edge is detected in the track data signal by edge detector 91, counter 92 is reloaded with a value equal to half the over sampling factor and begins counting down at a rate determined by $\Phi_{REF}$. When counter 92 reaches zero the track data signal is sampled and the counter stops counting. Since the initial count in counter 92 was half the over sampling factor, the track data signal is sampled approximately in the middle of the first bit period following the detected edge.

In addition, when counter 92 reaches zero, counter 93 is loaded with a value equal to the over sampling factor and begins to count down. Thus, counter 93 measures a one bit period interval beginning half a bit period after an edge in the track data signal. When counter 93 subsequently reaches zero, the track data signal is sampled. However, unlike counter 92, counter 93 repeatedly reloads and counts down, so that the track data signal is sampled at successive bit periods.

Figure 9B:
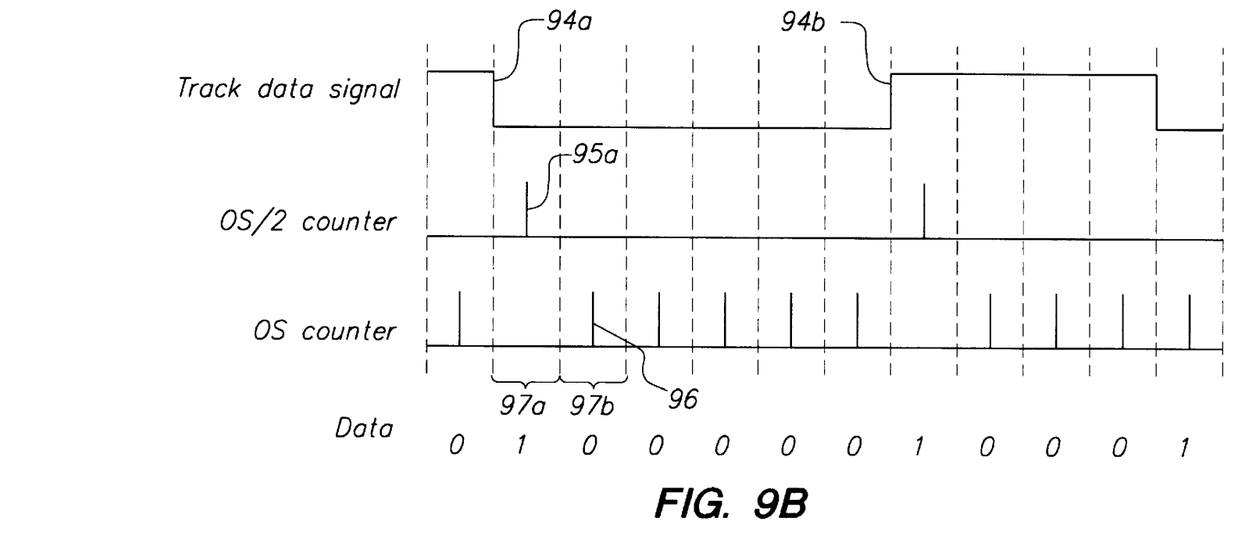

The operation of data aligner circuit 52 of FIG. 9A may be more clearly understood by considering the timing diagram of FIG. 9B. Wherein edge 94a causes counter 92 to reload and begin counting down. Counter 92 reaches zero and outputs signal 95a near the mid point of bit period 97a. This signal reloads counter 93 and also causes the track data signal to be sampled. Counter 93 then reaches a zero count and outputs signal 96a causing the track data signal to be sampled near the mid point of bit period 97b. Counter 93 repeats its countdown, thus, sampling successive bits in the track data signal until reset by counter 92 following edge 94b. Also shown is an exemplary decoding of the track data signal of FIG. 9B.

Figure 10:
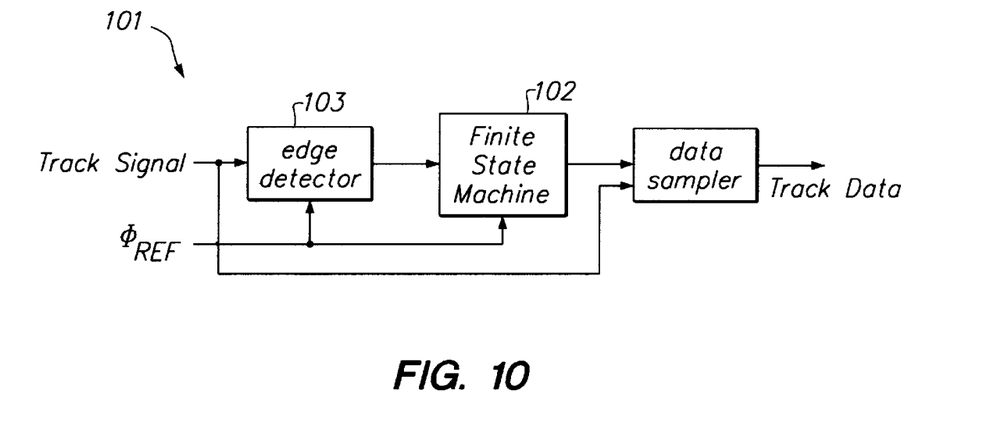
FIG. 10 is yet another illustrative embodiment of the data aligner of FIG. 7.

A somewhat simpler embodiment of the data aligner is shown in FIG. 10. Data aligner 101 includes synchronous finite state machine (FSM) 102 having a number of states equal to the over clocking factor. An exemplary state transition table for an eight state FSM is shown below.

Absent a signal from edge detector 103, FSM 102 cycles to the next state on each cycle of $\Phi_{REF}$. When state '0' is reached, a signal is output causing the track data signal to be sampled at fixed intervals equal to one bit period. However, when an edge has been detected, FSM 102 transitions to a middle state, e.g., state four, such that state '0' will be reached, and the track data signal sampled, half a bit period following the detected edge. Thus, the occurrence of an edge in the track data signal re-synchronizes FSM 102 with the track data signal so that data sampling occurs near the mid point of each bit period.

Parallel Write/Asynchronous Read Buffer

Figure 11:
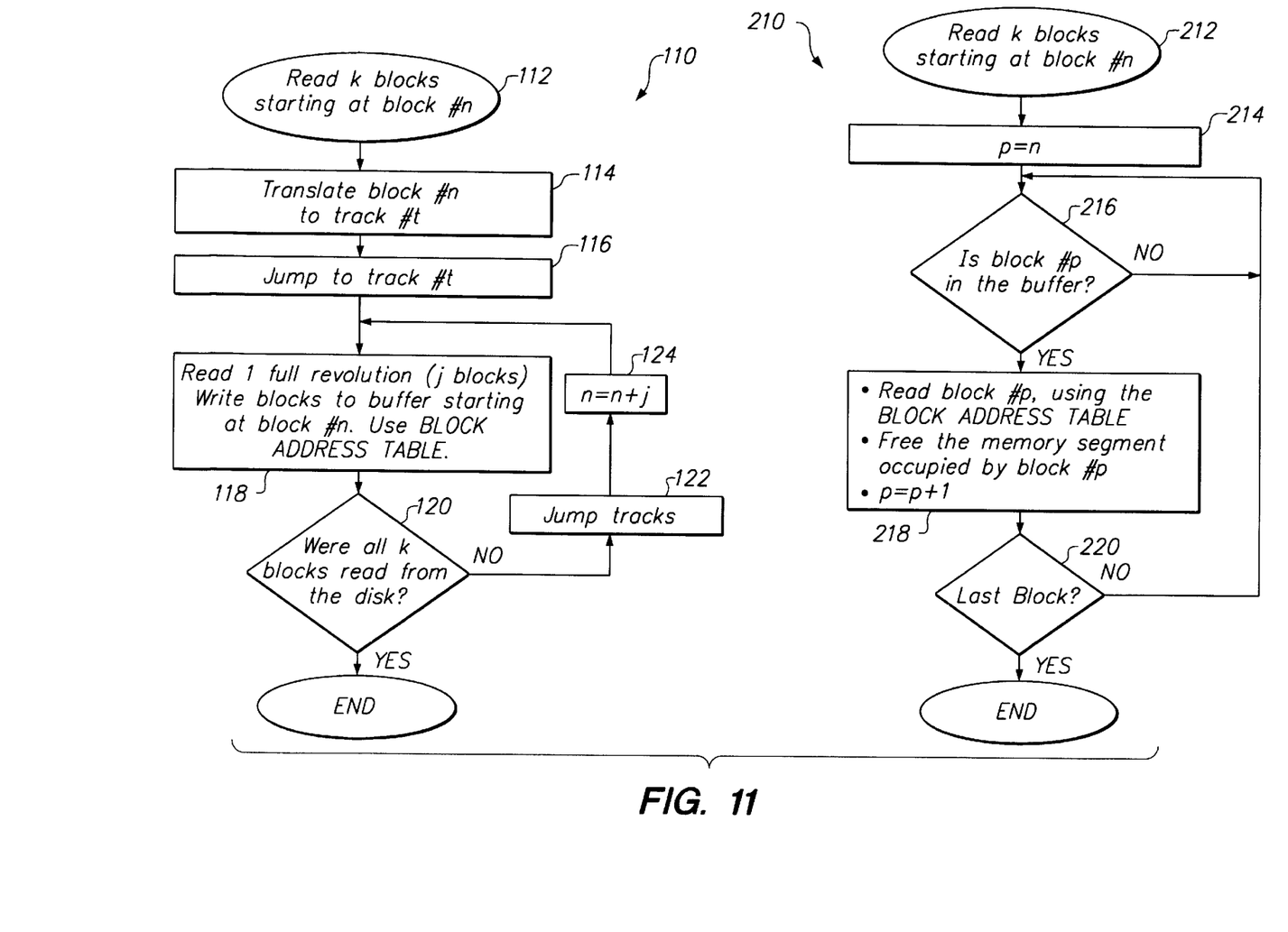
FIG. 11 is a flow chart outlining illustrative processes for reading a requested block of data from an optical disk and providing the requested block of data to a host processor.

Referring now to FIGS. 2 and 11, illustrative processes for reading and writing blocks of data in parallel from the optical disk to a buffer and for reading a block of data requested by host processor 23 are described. The process of providing a data block to a host processor is split into two asynchronous processes illustrated by flowcharts 110 and 210, corresponding, respectively, to reading data from the disk and the process of providing the data to the host processor.

Process 110 is entered, at 112, with a request to read a total of k data blocks starting at block n. At steps 114 and 116, controller 38 (see FIG. 2) calculates, or looks up in a table, the track t which contains data block n, and, if required, positions pickup assembly 27 to read track t as well as its adjacent tracks. When pickup assembly 27 has settled, a desired number of data blocks are read in parallel from optical disk 100 and stored in buffer 33. As data blocks are written to buffer 33, a Block Address Table is updated at step 118 to reflect the block numbers currently stored in the buffer. If at step 120 it is determined that all k data blocks have not been read, a new starting block is determined (step 124), and the pickup assembly is repositioned (step 122). Data reading process 110 terminates when all of the requested data has been read and transferred to buffer 33.

The process of flowchart 210 is performed concurrently with the process of flowchart 110. This process is entered when the host processor requests k data blocks beginning at block n. Upon receiving this request, controller 38 first initializes the routine at block 214 and determines at block 216 whether the data block is already in buffer 33 by consulting the Block Address Table. If the data block is present, then at step 218 the data block is retrieved from buffer 33 and transferred to host processor 23. If the data block has not been read yet, the process of flowchart 110 is initiated to read the desired block while process 210 waits for the data to become available in buffer 33. These steps are repeated as necessary until the last block of the requested data has been transferred to the host processor as determined in block 220.

In process 210, when a desired data block is read from buffer 33, the pointer to that portion of buffer 33 may be freed to be subsequently written by the blocks of data being read off of the optical disk by process 110. As described hereinabove, in one preferred embodiment of the invention, buffer 33 is capable of holding the data for about one full revolution of optical disk 100, e.g., buffer 33 is at least large enough to hold the data in one revolution of a single track multiplied by the number of tracks being read in parallel.

While preferred illustrative embodiments of the present invention are described, it will be obvious to one skilled in the art that various changes and modifications may be made therein without departing from the invention and it is intended in the appended claims to cover all such changes and modifications which fall within the true spirit and scope of the invention.

What is claimed is:

1. Apparatus for simultaneously reading multiple data tracks of an optical disk, the apparatus comprising:
   a pickup assembly providing a plurality of data signals corresponding to data stored in the multiple data tracks;
   a buffer;
   processing circuitry coupled to the pickup assembly and to the buffer, the processing circuitry comprising track processing circuitry that compensates for phase variations between the multiple data tracks, the processing circuitry recovering information stored on the optical disk and storing the information in the buffer; and
   subsequent processing circuitry coupled to the buffer, the subsequent processing circuitry operating asynchronously of the processing circuitry and retrieving the information from the buffer and providing the information to a host processor.

2. Apparatus as defined in claim 1 further comprising:
   circuitry for determining an address for a starting block of the information;
   circuitry for translating the address into a predetermined one of the multiple data tracks on the optical disk; and
   means for moving the pickup assembly to a location relative to the optical disk wherein the plural data signals include signals corresponding to the multiple data tracks.

3. Apparatus as defined in claim 1 wherein the subsequent processing circuitry comprises:
   circuitry for determining an address for a desired block of the information; and
   circuitry for determining whether the desired block of information is stored in the buffer or whether the desired block of the information must be read from the optical disk.

4. Apparatus as defined in claim 1 wherein the processing circuitry further comprises
   circuitry for multiplexing the plural data signals into a multiplexed data signal.

5. Apparatus as defined in claim 1 wherein:
   the processing circuitry further comprises demodulation circuitry for generating demodulated signals by demodulating the plurality of data signals; and
   the subsequent processing circuitry comprises decoding circuitry for generating decoded signals by performing a form of Cross-Interleaved Reed Solomon code decoding of the demodulated signals.

6. Apparatus as defined in claim 1 wherein the subsequent processing circuitry comprises circuitry for performing error correction of decoded signals.

7. A method of simultaneously reading multiple data tracks of an optical disk, the method comprising a series of steps of:
   illuminating multiple data tracks of the optical disk with plural illumination beams to create reflected illumination beams;
   receiving the reflected illumination beams with a plurality of detectors to generate a plurality of data signals, each one of the plurality of detectors generating a data signal corresponding to data stored in a corresponding data track;
   processing the plurality of data signals in parallel to recover information stored on the optical disk and storing the information in a buffer, the processing step comprising compensating for phase variations between the multiple data tracks; and
   asynchronously retrieving the information from the buffer.

8. The method as defined in claim 7 further comprising steps of:
   determining an address for a starting block of the information;
   translating the address into a predetermined one of the multiple data tracks on the optical disk; and
   moving the plurality of detectors to a location relative to the optical disk wherein the reflected illumination beams include the predetermined one of the multiple data tracks.

9. The method as defined in claim 7 wherein the step of asynchronously retrieving the information comprises:
   determining an address for a desired block of the information;
   determining whether the desired block of information is stored in the buffer or whether the desired block of the information must be read from the optical disk.

10. The method of claim 9 wherein the method further comprises a step of:

after reading the desired block of information from the buffer, freeing up a portion of the buffer from which the desired block of information was read.

11. The method as defined in claim 10 wherein the processing step further comprises generating demodulated signals by demodulating the plurality of data signals and generating decoded signals by performing a form of Cross-Interleaved Reed Solomon code decoding of the demodulated signals.

12. The method as defined in claim 11 wherein the processing step further comprises performing error correction of the decoded signals.

* * * * *